United States Patent [19]
Reinert et al.

[11] 3,954,969
[45] *May 4, 1976

[54] PRODUCT AND PROCESS FOR TREATING AND RESTORING HONEYCOMBS INFECTED WITH AMERICAN FOULBROOD DISEASE

[76] Inventors: Charles P. Reinert, Rte. 1, Box 149, Garvin, Minn. 56132; Samuel F. Tutt, 1603 Baker St. Apt. 8, Laramie, Wyo. 82070

[ * ] Notice: The portion of the term of this patent subsequent to Dec. 4, 1990, has been disclaimed.

[22] Filed: Dec. 3, 1973

[21] Appl. No.: 421,359

Related U.S. Application Data

[63] Continuation-in-part of Ser. No. 226,196, Feb. 14, 1972, Pat. No. 3,775,786.

[52] U.S. Cl. .................................... 424/93; 6/12 R
[51] Int. Cl. ............................................. A01n 15/00
[58] Field of Search .................. 424/93; 119/1; 6/12

[56] References Cited
UNITED STATES PATENTS
3,285,748    11/1966    Koonz et al ........................... 424/93

*Primary Examiner*—Frederick E. Waddell
*Attorney, Agent, or Firm*—Williamson, Bains & Moore

[57] ABSTRACT

A process for treating and restoring honeycombs infected with American Foulbrood Disease (*Bacillus larvae*). Includes the steps of applying a liquid suspension containing living spores of the mold *Penicillium waksmani* Zaleski (or near) to the cell wall surfaces of a honeycomb infected with American Foulbrood. The concentration of living spores of *Penicillium waksmani* Zaleski (or near) in the suspension is approximately 5 to 10 million spores per milliliter of suspension. After the application of the liquid suspension to the honeycomb, the honeycomb is then allowed to remain at a temperature of about 65° to 75°F and at a relative humidity of about 85% for a period of time to permit sufficient growth of the mold *Penicillium waksmani* Zaleski (or near) so that the mold covers the honeycomb, including the cell walls. The honeycomb is then placed in a well populated beehive where the bees remove American foulbrood scales and the dried mold and consequently clean each honeycomb cell.

The product used in carrying out the process comprises a dried product, including a blended mixture of a dried milk base, a small amount of a dried detergent and a small amount of a dried living spores of the mold *Penicillium waksmani* Zaleski (or near). In use, the dried product is dissolved in water to form the suspension containing the desired concentration of living spores.

5 Claims, No Drawings

PRODUCT AND PROCESS FOR TREATING AND RESTORING HONEYCOMBS INFECTED WITH AMERICAN FOULBROOD DISEASE

FIELD OF THE INVENTION

This invention relates to a biological product and a process used in the treating of honeycombs infected with American Foulbrood disease and is a continuation-in-part of my co-pending application, Ser. No. 226,196, filed Feb. 14, 1972, now U.S. Pat. No. 3,775,786 and entitled "A Biological Product and Process for Treating and Restoring Honeycombs Infected with *Bacillus larvae* (American Foulbrood Disease)". My co-pending application is incorporated by reference in its entirety with respect to the subject application.

SUMMARY OF THE INVENTION

It has been found that honeycombs infected with *Bacillus larvae* (American Foulbrood Disease) may be biologically treated and restored by applying living spores of the mold Penicillium to the infected honeycomb, and allowing the mold to grow. After the mold has covered the surface of the infected honeycomb, the honeycomb is then placed in a well populated beehive and the bees remove both the mold and the American foulbrood scales to thereby restore the comb to a cleaner, less infectious condition. This biological product and process has been carefully described in my co-pending application, filed Feb. 14, 1972, Ser. No. 226,196 and entitled "A Biological Product and Process for Treating and Restoring Honeycombs Infected with *Bacillus larvae* (American Foulbrood Disease)".

It is an object of this invention to provide an improved product and process for biologically treating and restoring honeycombs infected with American Foulbrood Disease, wherein a suspension containing a predetermined concentration of the living spores of the mold *Penicillium waksmani* Zaleski (or near) is applied to the diseased honeycomb. The mold is allowed to grow at a temperature of about 65° to 75°F and at a relative humidity of about 85% until the mold substantially covers the honeycomb. The honeycomb is then placed in a well populated beehive where the bees remove not only the mold, but any of the residual scales which under normal conditions adhere tightly to the cell walls of the honeycomb.

It has been found that a concentration of about five to ten million spores per milliliter of treatment suspension gives best results, especially when the suspension is provided with a small amount of a detergent or wetting agent which provides a more homogeneous suspension. The biological is prepared as a dry product which includes a blended mixture of the dried mold spores, a dried milk base and a small amount of dried detergent. It has been found that the dried biological product has good keeping qualities thus permitting users to retain substantial supplies of the product on hand.

These and other objects and advantages of this invention will more fully appear from the following description made in connection with the accompanying drawings wherein like reference characters refer to the same or similar parts throughout the several views.

DESCRIPTION OF THE PREFERRED EMBODIMENTS OF THE INVENTION

In the present improved biological product and process, honeycombs infected with *Bacillus larvae* (American Foulbrood Disease) are treated with a liquid suspension containing the living spores of the mold Penicillium and the mold is allowed to grow so that it not only covers the entire surface of the infected honeycomb, but also permeates the substrate scale material which commonly occurs in diseased honeycomb cells. The honeycomb is then placed in a well populated beehive and the bees remove the mold and the scales so that the honeycomb is restored to a cleaner, less infectious condition. This process is described and claimed in my copending application, Ser. No. 226,196, entitled "A Biological Product and Process for Treating and Restoring Honeycombs Infected with *Bacillus larvae* (American Foulbrood Disease)".

However, in my co-pending application, it was pointed out that while the particular species of the genus Penicillium mold had not been precisely determined, it was thought that the identity of this species was restricted to the monoverticillata section, ramigena series. It has now been found that the microorganism involved in this treating, cleaning and restoring process is *Penicillium waksmani* Zaleski (or near). In carrying out the present process, a suspension containing the living spores of *Penicillium waksmani* Zaleski (or near) is applied to the diseased honeycomb as in my co-pending application. It has been found that the optimum concentration of spores of *Penicillium waksmani* Zaleski (or near) is approximately five to ten million spores per milliliter of treatment suspension.

After the suspension has been applied to the diseased honeycomb, so that the suspension contacts and moistens the cell walls, the honeycomb is then allowed to remain in a damp, warm environment for a predetermined period of time to permit growth of the mold. In this respect, the best conditions conducive to good growth is at a temperature of about 65° to 75°F and at a relative humidity of about 85%. Under these conditions, good growth occurs in approximately a week. The mold will not only cover the entire surface area of the diseased honeycomb, but the mold also penetrates the substrate scale material within the cells of the honeycomb. Thereafter, the treated honeycomb is placed in a well populated healthy hive and the bees very rapidly remove the dried scale and mold material from the cell wall.

It is thought that during the growth phase of the present process, the mold *Penicillium waksmani* Zaleski (or near) in penetrating the substrate scale material not only loosens the scale material within the cell to thereby make it easier for the bees to remove this material, but also partially breaks down the scale material. The mold growth within the cell also appears to function as an excitant and apparently stimulates the bees to clean more thoroughly than if there was no mold growth present. It is also pointed out that the use of the present biological process not only permits an excellent degree of cleaning and restoration of a diseased hive, but there is no biochemical effect upon the viability of the American foulbrood spores as is the case quite often through the use of broad spectrum antibiotics.

The biological product is produced as a dried product which may be readily dissolved in water, when it is to be applied to diseased honeycombs. In this respect, the dried product is comprised of a dried milk base, dried spores of the mold *Penicillium waksmani* Zaleski (or near), and a small amount of a dried detergent. The dried product is thoroughly mixed so that it is in a substantially homogeneous condition. In the preferred embodiment, the mixture contains approximately 3000 parts per million of the dried spores of the mold *Penicillium waksmani* Zaleski (or near), and contains approximately 6000 parts per million of the dried detergent. Any suitable non-toxic commercial detergent may be used and the detergent serves as an efficient wetting agent and assures good contact of the mold suspension with the interior walls surfaces of the cells of the diseased honeycombs. Through the use of the dried milk base, the dried products when dissolved in water will have the desired neutral pH of about 7. After the dried product is dissolved in water, the suspension may be applied as a light spray directly into the cells of the diseased honeycomb or alternatively, the honeycomb may be subjected to a heavy spray and the excess suspension may then be removed from the honeycomb by shaking.

As pointed out in my co-pending application, the use of a completely biological approach in the treatment, cleaning and restoration of honeycombs infected with American Foulbrood Disease not only minimizes reinfection by *Bacillus larvae*, but the present process also minimizes the occurrence of resistant strains of *Bacillus larvae* which is attendant with increased use of chemotherapy. Thus, it will be seen that we have provided an improved biological process and product which is highly effective in the treatment, cleaning and restoration of honeycombs infected with American Foulbrood scales.

We claim:

1. A process for treating diseased honeybee combs infected with American Foulbrood, comprising:

applying a liquid suspension containing living spores of the mold *Penicillium waksmani* Zaleski to the cell wall surfaces of a honeycomb infected with American Foulbrood scales, allowing the honeycomb to remain at a temperature of about 65° to 75°F and at a relative humidity of about 85% for a period of time to permit sufficient growth of the mold, *Penicillium waksmani* Zaleski to cover the comb including the cell walls thereof, then placing the comb in a well populated beehive whereby the American Foulbrood scales and dried mold *Penicillium waksmani* Zaleski are removed from the honeycomb cells by the bees.

2. The process as defined in claim 1 wherein said suspension contains a wetting agent.

3. The process as defined in claim 1 wherein the concentration of living spores of the mold *Penicillium waksmani* Zaleski in the suspension is approximately five to ten million spores per milliliter of suspension.

4. The process as defined in claim 1 wherein the diseased honeycomb, after the application of the liquid suspension thereto, is allowed to remain at a relative humidity of about 85%.

5. A process for treating diseased honeybee combs infected with American Foulbrood, comprising:

applying a liquid suspension containing living spores of the mold *Penicillium waksmani* Zaleski to the cell wall surfaces of the honeycomb infected with American Foulbrood, the concentration of living spores of *Penicillium waksmani* Zaleski in the suspension being approximately five to ten million spores per milliliter of suspension, allowing the honeycomb to remain at a temperature of about 65° to 75°F and at a relative humidity of about 85% for a period of time to permit sufficient growth of the mold *Penicillium waksmani* Zaleski to cover the comb including the cell walls, then placing the comb in a well populated beehive whereby the American Foulbrood scales and dried mold *Penicillium waksmani* Zaleski are removed from the honeycomb cells by the bees.

* * * * *